(12) United States Patent
Houston et al.

(10) Patent No.: US 6,575,421 B1
(45) Date of Patent: Jun. 10, 2003

(54) ADJUSTING DEVICE FOR A VEHICLE SEAT WITH A SPINDLE AND AN ASSOCIATED SPINDLE NUT

(75) Inventors: Robert Houston, Deutschland (DE); Burkhard Becker, Deutschland (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 0 days.

(21) Appl. No.: 09/696,849

(22) Filed: Oct. 26, 2000

(30) Foreign Application Priority Data

Nov. 25, 1999 (DE) .......................... 199 56 614

(51) Int. Cl.[7] .............................................. F16M 13/00
(52) U.S. Cl. ....................................... 248/429; 297/330
(58) Field of Search ................................. 248/424, 429, 248/430; 297/330

(56) References Cited

U.S. PATENT DOCUMENTS

| | | | |
|---|---|---|---|
| 4,093,280 A | * | 6/1978 | Yoshizawa et al. |
| 4,285,545 A | | 8/1981 | Protze |
| 5,150,872 A | * | 9/1992 | Isomura |
| 5,349,878 A | * | 9/1994 | White et al. |
| 5,761,963 A | * | 6/1998 | Hartwig |
| 5,823,499 A | * | 10/1998 | Ito et al. |

FOREIGN PATENT DOCUMENTS

DE       198 15 283        10/1999

* cited by examiner

*Primary Examiner*—Korie Chan
(74) *Attorney, Agent, or Firm*—Akerman Senterfitt

(57) ABSTRACT

The invention relates to an adjusting device for a vehicle seat having a first adjusting element (20) and a second adjusting element (22) that is motion-linked to the first adjusting element (20), particularly a length-adjustment device for an underframe of the vehicle seat relative to a seat part, whereas the adjusting device (24) has a spindle (26) and an associated spindle nut (30) encompassing the spindle (26) and whereas the spindle (26) is non rotatably fastened onto the first adjusting element (20) of the adjusting device and the spindle nut (30) a) is rotatably carried in the second adjusting element (22), b) forms on its outer case a worm wheel that engages the worm (32) which may be connected to a multi turn actuation (36), c) is made of synthetic material and d) is encompassed on either of its two axial end areas by a reinforcing barrel (60) that encircles the corresponding end area of the spindle nut (30).

17 Claims, 2 Drawing Sheets

Figure 3:
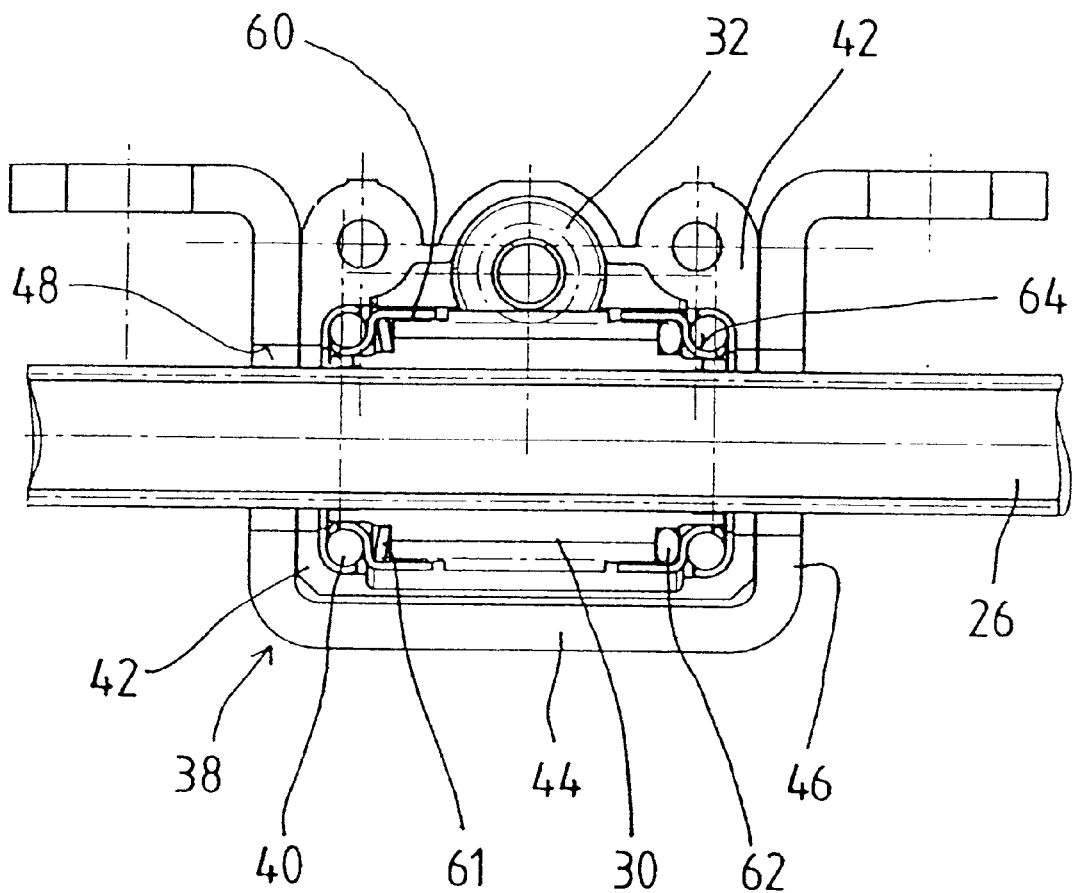

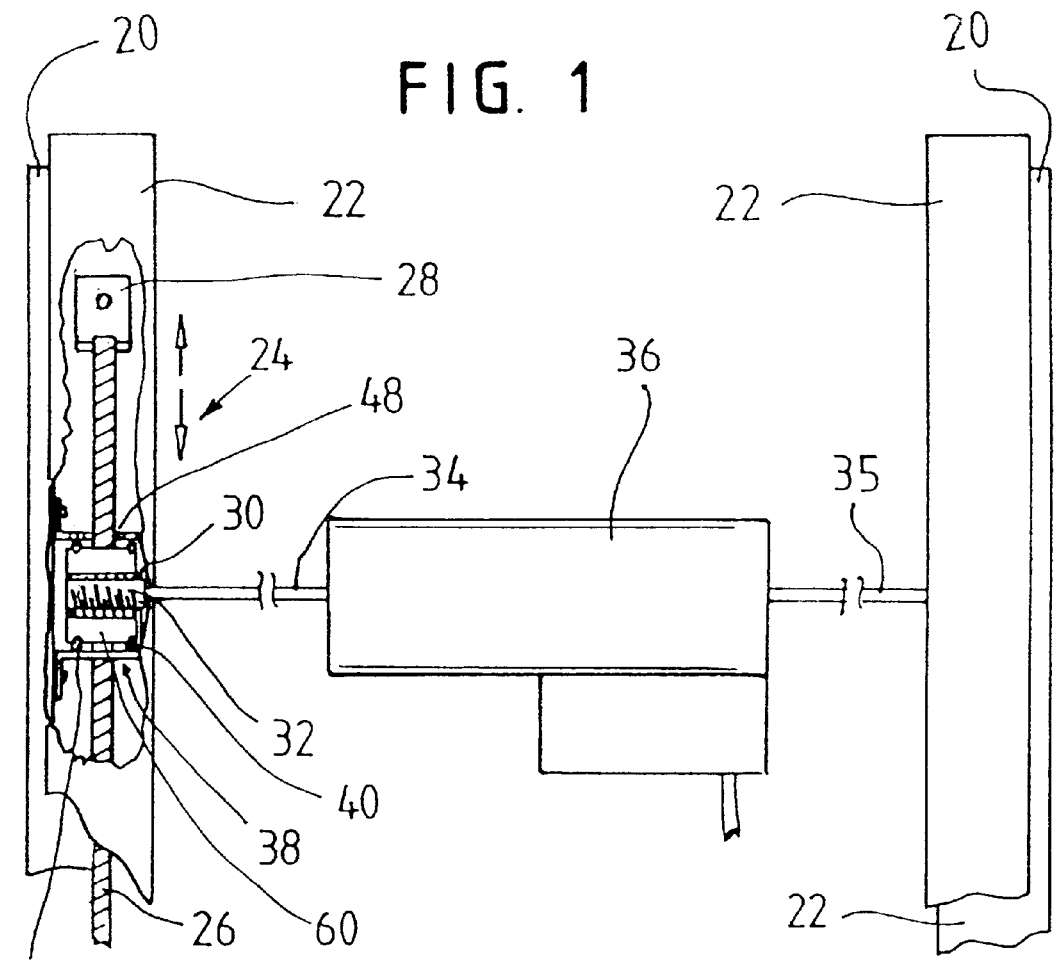
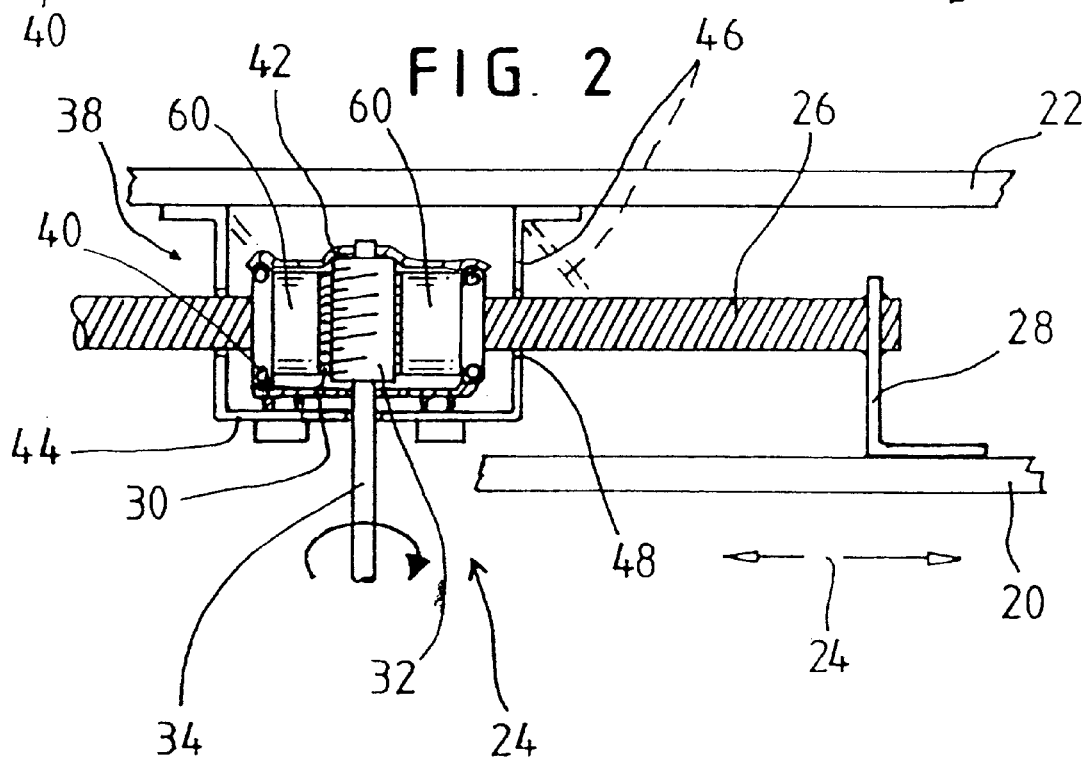

ADJUSTING DEVICE FOR A VEHICLE SEAT WITH A SPINDLE AND AN ASSOCIATED SPINDLE NUT

The invention relates to an adjusting device for an adjustable vehicle seat which is provided with a first adjusting element and with a second adjusting element. The second adjusting element is motion-linked with the first adjusting element. The motion-linkage is either a swivelling linkage or a linear guiding. When designed as a linear guiding, the adjusting device is particularly conceived to serve as a for and aft adjustment device for an underframe of the vehicle seat relative to a seat part. The adjusting device has a threaded spindle and a spindle nut encompassing the spindle. The spindle is non rotatably fastened onto the first adjusting element of the adjusting device. The spindle nut is rotatably carried on the second adjusting element and forms on its outer case a worm wheel which meshes with a worm which in its turn may be connected to a multi turn actuation.

Such an adjusting device is known for example from DE 198 15 283 A.

The present invention constitutes a development of the European Patent Application 99 111 911 with priority date Aug. 12, 1998 which is not prepublished. The complete content of the disclosure of this European Application constitutes an inherent part of the present application.

The European Application already suggests having the spindle nut made of plastic. To have the spindle nut made of plastic provides on one side benefits for an advantageous accurate manufacturing and on the other side for a very silent run. A spindle nut made of plastic however does not have the stability of a spindle nut made of metal. Particularly in cases of loads occasioned by an accident and exerted onto the adjusting device, the spindle nut may expand or split. By a load occasioned by an accident a load is meant which exceeds the loads of normal driving and which triggers safety devices such as for example air bags, seat belt tighteners and the like. The situations dealt with here are such as arise in the event of an accident.

The present invention constitutes a development of the U.S. Pat. No. 6,260,922, issued Jul. 17, 2001. The complete content of the disclosure of this U.S. Patent constitutes an inherent part of the present application, and is hereby incorporated by reference.

The invention aims to permit to further use a nut made of synthetic and at the same time to somehow overcome the drawbacks, particularly those regarding the reduced stability over a metallic spindle nut.

On the basis thereof, it is the object of the present invention to develop the adjusting device of the type mentioned above so that the spindle nut may be made of synthetic material and is thereby reinforced with simple means in such a manner that splitting or expanding of the spindle nut in the event of longitudinal loading of the spindle is prevented or at least only occurs under much higher loads than if the measures according to the invention had not been taken.

The solution of this object is to provide an adjusting device for a vehicle seat having a first adjusting element and a second adjusting element that is motion-linked to the first adjusting element, particularly a length-adjustment device for an underframe of the vehicle seat relative to a seat part, whereas the adjusting device has a spindle and an associated spindle nut encompassing the spindle and whereas the spindle is non rotatably fastened onto the first adjusting element of the adjusting device and the spindle nut a) is rotatably carried in the second adjusting element, b) forms on its outer case a worm wheel that engages a worm which may be connected to a multi turn actuation, c) is made of synthetic material and d) is encompassed on either of its two axial end areas by a reinforcing barrel that encircles the corresponding end area of the spindle nut.

On this adjusting device, the spindle nut made of synthetic material is provided on either of its two axial end areas with one reinforcing barrel which encompasses the spindle nut and is non rotatably linked to it. The two reinforcing barrels are extending as far as admissible towards the central area of the spindle nut. That is, they extend so far toward the central area as they do not hinder the motion of the worm. The reinforcing barrels considerably enhance the stability of the spindle nut in its end areas, which increases the stability of the whole system.

The advantageous features of a spindle nut made of synthetic material are maintained. Mounting is not rendered more difficult. It is actually made even easier, as will be seen in the following. Finally, the two reinforcing barrels constitute a piece that is inexpensive and easy to manufacture and that, in a developed embodiment, may even be configured integral with a bearing shell of a terminal bearing for the spindle nut so that, while the additional mechanical expenditure for the reinforcing barrels is small, the achieved increase in rigidity is considerable.

In a preferred development the reinforcing barrel therefore is provided toward the end area of the spindle nut with an annular vault forming a bearing surface for a bearing. In particular, the bearing surface formed is that of a ball bearing. The bearing surface, which is needed anyway and which is formed on a bearing ring, is combined in this way with the reinforcing barrel to form one unique piece. The mounting of the bearing is thus made easier, while the expenditure is only slightly increased.

In a preferred development, a ring made of elastic material, particularly a spring lock washer or an O-ring made of rubber, is arranged between the reinforcing barrel and the spindle nut. It preferably is located in the transition area between the reinforcing barrel and the bearing surface. The reinforcing barrel is preferably directly connected to the spindle nut by its end pointing toward the central area of the spindle nut. Seen from there, the elastic means is provided outwardly axially, said means serving to attenuate the development of noise of the axially even farther outward located bearing and to achieve positioning.

The reinforcing barrel may preferably be pushed axially onto the spindle nut. This permits a very easy installation. It furthermore preferably has an outer diameter that corresponds to the outer diameter of the threaded section of the worm wheel. Accordingly, the reinforcing barrel does not require additional space, the reinforcing barrel may on the contrary be arranged externally to the meshing area of the worm in an area in which, according to prior art, threads are still provided.

In a preferred embodiment the reinforcing barrel is made of metal. The considerably higher rigidity is achieved in this way. The reinforcing barrel is preferably provided with a radially running area that has got the shape of a circular ring. This area may also be omitted though. The essential part is an axially running casing area which is essentially cylindrical.

In another preferred embodiment, the spindle nut is encompassed by a plastic casing that receives at its ends bearings for carrying and positioning the spindle nut. This plastic casing may be manufactured at low cost, it additionally is light and reduces noise. In a preferred development it is encompassed by a holder made of metal which is essentially U-shaped. This holder on one side provides for mechanical stability, on the other it may bend under loads occasioned by an accident and as a result interlock at the spindle, thus contributing to its stability in case of loads occasioned by an accident.

Further advantages and characteristics of the invention will become apparent in the remaining claims and in the following description of an embodiment that is only an example and is not limiting the scope of the invention. Said embodiment is explained in more detail with reference to the drawing. In this drawing FIG. 1 is a top view, sectional in parts, of an adjusting device for the length-adjustment, i.e. for and aft adjustment of a vehicle seat relative to an underframe of an automotive vehicle and with reinforcing barrels of the invention for the spindle nut, FIG. 2 is a top view, sectional in parts, of an alternative embodiment of an adjusting device; and FIG. 3 is an illustration similar to FIG. 2, but turned by 90 degrees and with a plastic spindle nut and two reinforcing barrels.

As shown in the Figures, the adjusting device has a first adjusting element 20 that is here designed as a bottom rail of a couple of rails, said bottom rail being connectable with the underbody or underframe or structural frame of the vehicle. The second adjusting element 22 is a seat rail which may be moved relative to said bottom rail and which is guided together with it, for example by being guided in it. The adjusting direction is shown by the double arrow 24.

The first adjusting element 20 is linked with a spindle 26 that is firmly arranged at its upper end in FIG. 1 via an angular holding part 28 on the first adjusting element 20. The other end of the spindle is preferably not fastened, but it may also be held in a yielding holding device, for example in a rubber block.

The spindle 26 is encompassed by a spindle nut 30. It is made of synthetic material. Its outer case constitutes a worm wheel. Said worm wheel is engaged with a worm 32. The worm is rotatably linked with an electric motor constituting here the multi turn actuation via a shaft 34. This shaft 34 may be relatively small in section, it may for example be a plastic rod. Particularly appropriated shafts 34 are flexible shafts such as for example speedometer drives.

As may be seen in FIG. 1, the electric motor 36 also has a turning outlet on its other end too, in other words, its output shaft is traversing it axially. On the other side and equiaxed with shaft 34 a shaft 35 of the same design is provided that actuates an adjusting device of the right seat side which is identical with the one of the left seat side, preferably of identical design.

The spindle nut 30 is rotatably arranged in a holder 38. Two ball bearins 40 are provided between the spindle nut 30 and the holder 38. In the embodiment shown in FIG. 1, the inner race for the ball bearings 40 is formed by cup-shaped rings in barrel 60, and the outer race for the ball bearings 40 is directly formed on the inner surfaces of flanges 48. In alternative embodiments, as may particularly be seen in FIGS. 2 and 3, the spindle nut 30 itself is accommodated in a cage or casing 42 made of synthetic material such as plastic, the ball bearings being arranged between the cage 42 and the spindle nut 30. The cage 42 is connected with the holder 38 by means of screws. Other designs are possible.

The holder 38 has a base 44 running essentially parallel to the first adjusting element 20 as well as two flanges 46 that are perpendicular to said base. The flanges have an L-shape or L-bend by means of which they are each connected with the second adjusting element 22.

The flanges 46 are provided with openings 48 for the free passage of the spindle 26. They have a clear diameter being slightly bigger than the outer diameter of the spindle 26. These openings are not noticeable during normal operation. In case of an accident, when a misplacement force is generated between the two adjusting elements 20, 22, the spindle nut 30 is entraining her auxiliary holder 38, the holder is slanting, as it is hinted at by the dashed line in FIG. 2, see flange 46. The edges of the opening 48 are thus getting in touch with the screw threads of the spindle 26 and a mechanical engagement is taking place. A further motion between the two adjusting elements 20, 22 due to an accident is generally slowed down so much that it comes to an end.

The passageways 48 are either allotted with nuts encompassing the spindle 26 with a large clearance or are radially slit and thereby transformed into a single-flighted nut. In so doing, interlocking in case of loads occasioned by an accident is improved. These nuts however have to act as inconspicuously as possible in practical operation, which means they have to engage the threads of the spindle 26 with a large clearance without producing additional noise during operation.

As shown in the Figures, the spindle nut 30 has a central area that is slightly wider than the diameter of the driving worm 32. In this central area, the driving worm 32 and the spindle nut 30 made of synthetic material may cooperate unhindered.

On either side of this central area, the spindle nut 30 is encompassed and covered by one reinforcing barrel 60. The reinforcing barrel 60 has essentially the shape of a ring. It is made of metal, in particular of steel. In the embodiment according to FIG. 1 it also covers the front side of the spindle nut 30, that is, it has a cylindrical ring area and a radial ring area.

In the embodiment according to FIG. 2 the reinforcing barrel 60 is configured as a cylindrical ring without radial areas. A cage 42 is fixed to the base 44 of holder 38. The rings 60 form inner races for the ball bearings 40, with outer races formed by a cage 42. The embodiment according to FIG. 3 will be described explicitly in the following:

Just as in the previous embodiments, the two reinforcing barrels for the spindle nut 30 which are located at the end sides are seamless ring parts made of sheet iron of a wall thickness of 1 mm for example. They are pushed onto the free ends of the spindle nut 30 and are fastened in an appropriate manner.

As shown in FIG. 3, the thread of the spindle nut 30 only extends in a central area amounting to approximately 40% of the overall length of the spindle. The overall length of the spindle amounts to approximately 25 mm.

Outside this central area the spindle nut 30 tapers stepwise toward its free ends. In the first place, the outer diameter is reduced in a first step so that only about half the height of the spindle nuts 30's threads remains. In a further step the diameter is reduced to be considerably smaller than the minor diameter of the thread. There, an inner corner is formed in which a ring 61 that has an axially directed 'spring action, e.g., a corrugated washer, a Belleville spring washer or an annular spring, is arranged on the left side thereof and an O-ring 62 is arranged on its right side. In a third step the diameter is slightly further reduced. There a bearing 40 designed as a ball bearing is located. In the area of the first step the reinforcing barrel 60 of either end area is radially adjacent to the spindle nut and is centered in this way. A small air gap remains axially so that process tolerances may be compensated. The outer diameter of the reinforcing barrel 60 hereby essentially corresponds to the outer diameter of the central area.

The diameter of the reinforcing barrel 60 becomes smaller behind the ring or the O-ring 62 resp., seen in the direction away from the central area, there the reinforcing barrel forms a guiding surface 64 having the shape of a groove for the balls of the bearing 40. In other words, the inner bearing shell of the ball bearing 40 is axially lengthened toward the central area and configures there the actual reinforcing barrel 60. As shown in FIG. 3, the bearing 40 also has an outer bearing surface constituted by an appropriate ring, the outer diameter thereof essentially matching the outer diameter of the reinforcing barrel 60. This ring is held in a cage 42 designed as a plastic casing. This plastic casing also receives the driving worm 32. It is designed to conform to the shape of the hollow space configured by the holder 38. The arrangement composed of the spindle nut 30, two reinforcing barrels 60 and two bearings 40 is positioned in the casing 42 on account of the axial elasticity of the rings 61, 62 (in particular of the spring lock washer 61).

What is claimed is:

1. An adjusting device for an adjustable vehicle seat, said adjusting device arranged between a first adjusting element and a second adjusting element, said adjusting device being capable of adjusting said first adjusting element relative to said second adjusting element, said adjusting device comprising:
a threaded spindle and an associated spindle nut, the spindle nut encompassing the spindle, the spindle being fixed to the first adjusting element of the adjusting device whereby the spindle is non-rotatable;
wherein the spindle nut:
a) is carried by the second adjusting element so that the spindle nut can be rotated,
b) has an outer case and defines a worm wheel on said outer case that engages a worm which is connectable to a multi-turn actuation device;
c) is made of a synthetic material; and
d) has two axial end areas and is encompassed on each of these two axial end areas by a reinforcing barrel that encircles the corresponding axial end area of the spindle nut and is non-rotatably linked to the spindle nut.

2. The adjusting device according to claim 1, wherein the reinforcing barrel is provided with an annular vault, which annular vault is arranged at the axial end area of the spindle nut, said annular vault forming a bearing surface for a ball bearing.

3. The adjusting device according to claim 1, wherein a ring made of elastic material is arranged between the reinforcing barrel and the spindle nut.

4. The adjusting device according to claim 1, wherein a central area of the spindle nut has an outer diameter and wherein the axial end areas of the spindle nut have a smaller outer diameter than said central area of the spindle nut.

5. The adjusting device according to claim 1, wherein said worm wheel has a minor diameter, said minor diameter being measured in valleys of a gearing of the worm wheel, and the axial end areas of the spindle nut have a diameter which is larger than the minor diameter of the worm wheel.

6. The adjusting device according to claim 1, wherein the axial end areas of the spindle nut are provided with at least one shoulder.

7. The adjusting device according to claim 1, wherein the outer diameter of the spindle nut diminishes stepwise in its axial end areas and toward a free axial end of the spindle nut and that the reinforcing barrel is pushed axially onto the free axial end.

8. The adjusting device according to claim 1, wherein a bearing is provided in the vicinity of a free end of the spindle nut.

9. The adjusting device according to claim 1, wherein the spindle has an axis and the worm has a rotational axis, said rotational axis running across the axis of the spindle.

10. The adjusting device according to claim 1, wherein the reinforcing barrel is made of metal.

11. The adjusting device according to claim 1, wherein the spindle nut is encompassed by a plastic casing and a bearing is provided between this plastic casing and the spindle nut.

12. The adjusting device according to claim 11, wherein the plastic casing is encompassed by an U-shaped holder, which U-shaped holder has a base and two flanges, said flanges each projecting toward said base, a passageway for the spindle being provided in each of said flanges.

13. The adjusting device according to claim 3, wherein said ring made of elastic material is an O-ring made of a rubber.

14. The adjusting device according to claim 3, wherein said ring made of elastic material is a spring lock washer made of a metal.

15. The adjusting device according to claim 8, wherein said bearing is a ball bearing.

16. The adjusting device according to claim 1, wherein the worm is connected directly with an output shaft of an electric motor.

17. The adjusting according to claim 11, wherein a bearing is provided at each free axial end of the spindle nut.

* * * * *